(12) United States Patent
Fitzpatrick et al.

(10) Patent No.: US 6,877,138 B2
(45) Date of Patent: Apr. 5, 2005

(54) TRANSFERRING PROPERTIES BETWEEN COMPUTER OBJECTS

(75) Inventors: Gregory Peter Fitzpatrick, Keller, TX (US); Thomas Richard Haynes, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 572 days.

(21) Appl. No.: 10/099,058

(22) Filed: Mar. 14, 2002

(65) Prior Publication Data

US 2003/0174174 A1 Sep. 18, 2003

(51) Int. Cl.$^7$ .................................................. G09G 5/00
(52) U.S. Cl. ...................... 715/769; 715/777; 715/825; 715/826; 715/810
(58) Field of Search ................................ 715/810, 902, 715/769, 777, 825, 826, 762, 765

(56) References Cited

U.S. PATENT DOCUMENTS

| | | | | |
|---|---|---|---|---|
| 6,016,146 | A | 1/2000 | Beer et al. ................... | 345/349 |
| 6,100,885 | A | 8/2000 | Donnelly et al. ........... | 345/333 |
| 6,195,092 | B1 * | 2/2001 | Dhond et al. ................ | 715/763 |
| 6,300,949 | B1 * | 10/2001 | Shudo et al. ................ | 715/744 |

* cited by examiner

*Primary Examiner*—Ba Huynh

(74) *Attorney, Agent, or Firm*—Richard A. Tomlin

(57) ABSTRACT

The disclosed method enables a computer system user to efficiently modify attributes of objects displayed by the system and its software applications. Upon selection of a displayed target object by a user, a pop-up menu appears containing a 'Set Attributes to . . . ' option. Upon selection of that option by the user, the system cursor changes appearance, and the user is allowed to locate and select a source object separate from the target object (potentially, in a stored file or display window separate from the file and window containing the target object). Upon selection of the source object by the user, the attributes of the source object are immediately transferred to the target object, the display window containing the target object reappears (if it had been hidden by the action of locating the source object), and the display cursor appearance reverts to its normal form. In a variation of this process, the selection of the source object, if accompanied by a predetermined additional action by the user, causes a pop-up menu to appear offering the user selections of proper subsets of attributes possessed by the source object. Upon selection of a subset in that menu, only the respective subset is transferred to the target object and other attributes of the source object are not so transferred. In another variation of this process, selection of the target object in conjunction with an additional action by the user causes a secondary menu to appear. The secondary menu contains named sets of attributes. Upon selection of one of these, the respective named set of attributes is applied to the target object. A special choice in the secondary menu enables the user to specify, name, and transfer a new set of attributes.

8 Claims, 2 Drawing Sheets

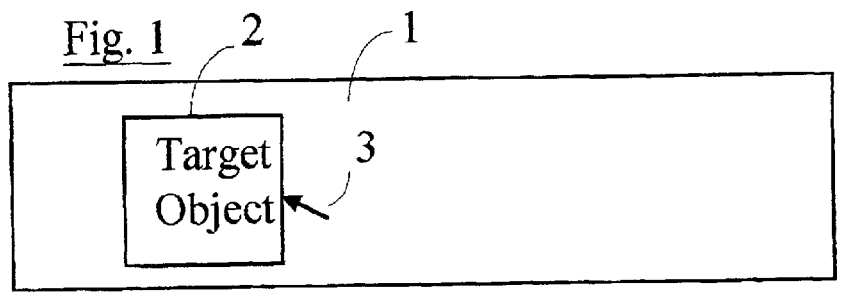
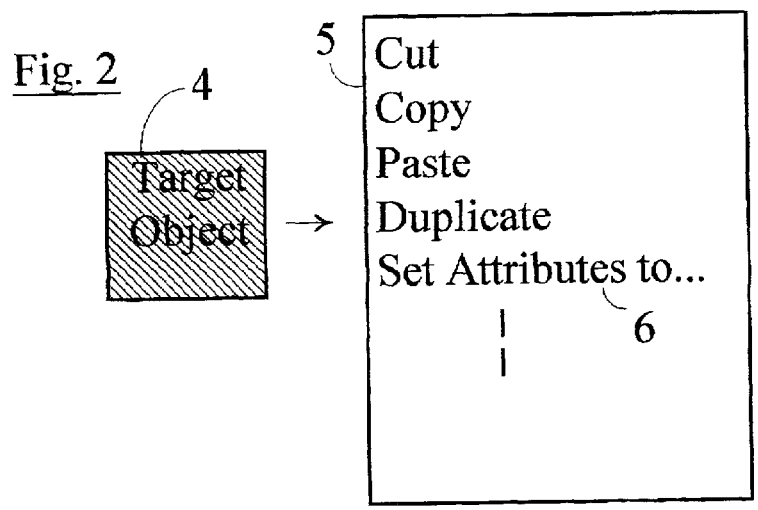
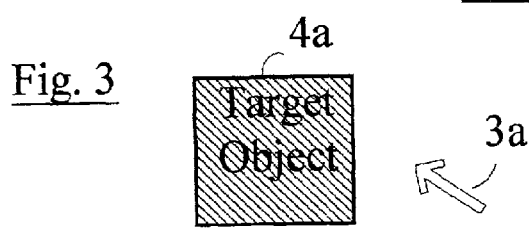
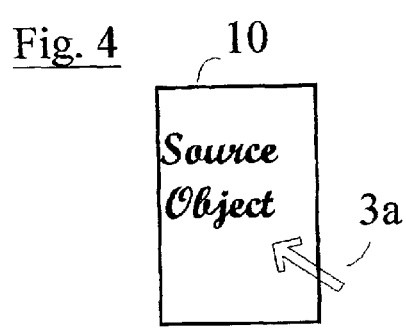
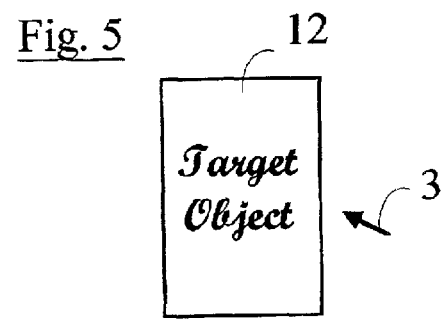

TRANSFERRING PROPERTIES BETWEEN COMPUTER OBJECTS

BACKGROUND OF THE INVENTION

Computer applications, for creating and manipulating objects typically have limited capability for changing object attributes or properties. Objects referred to herein include visual text and graphics, as well as signals representing audible sound.

Considering text, known applications allow a computer user to select a "target" block of text, as an object whose attributes are to be changed as a block (font, font size, bold, underlining, etc.). However, there is no known mechanism for enabling a user to efficiently transfer attributes of a source block of text to a target block, the latter located in the same file as the source, or in another file, or located in a window separate from a window displaying the source. With known applications, a user must view and remember attributes of a source object, locate and select the target object and perform one or more operations to apply the remembered attributes to the target object. This somewhat tedious process is even more involved when there are multiple target objects to change (e.g. multiple text characters to receive different attribute changes).

A similar problem pertains to changing attributes of graphic objects. Presently, attributes of a source graphic object can not easily be transferred to a target object. With known applications, a user would have to view and remember one or more source object attributes, select the target object, and perform processes to apply the remembered attribute(s) to the selected target.

Accordingly, an object of the present invention is to address this problem and provide a simple method of modifying attributes, but not inherent content or context, of computer-generated (target) objects.

SUMMARY OF THE INVENTION

In a preferred embodiment, the foregoing object is realized by incorporating a "Set Attributes To . . . " function in existing software applications and/or operating systems. To apply this function, the user selects a target object having attributes that are to be changed and performs an action to cause a menu of functional options to pop up or drop down adjacent the selected object; e.g. the action of clicking a special button on the system's mouse or equivalent cursor control device (e.g. the right button of the mouse). One of the options presented in this menu is the aforementioned "Set Attributes To . . . " function. When selected, this function causes the appearance of the user's display cursor to change to a form associated with an attribute transferral process. The user then locates a source object having the attributes to be transferred, and 'clicks' the (modified) cursor on that object. In response to this last action all relevant attributes of the source object are transferred to the target object.

The source and target objects may reside in a single display page of a document file, in different pages of a file, in pages of different files or in different computer display windows.

The action associated with the "Set Attributes To . . . " option can be terminated without effect; e.g. by operation of the keyboard "Escape" key, or by clicking the altered cursor symbol on a blank portion of the display screen, without selecting a source object.

In respect to text, this function could be used, for example, to alter attributes of a target text block containing multiple characters or sentences (e.g. font, font size, bold or underlining emphasis, etc.) to correspond to those of a source block or character of text. This is done by successively selecting the target block, performing the action to invoke the options menu containing the "Set Attributes To . . . " option, and then locating and selecting ("clicking on") the source block or character with the altered cursor symbol produced by the aforementioned action. In this example, all attributes of the target object would change to those of the source object or character (font, bold, underlining, background pattern/color if any, etc.), and effectively allow the user to avoid having to search through several menus to effect equivalent attribute changes.

In respect to graphic objects, this function could be used e.g. to alter attributes of a selected target object (appearance, shadowing, line thickness, background pattern or color, etc.) to those of a subsequently selected source object.

A refinement or alternate embodiment of this technique would allow a user to be more specific about which attributes of a selected target object are to be changed. In this variation, the user selects a target object and 'Set Attributes To . . . ' as before, but modifies action on the source object (e.g. holds the left mouse button depressed past some predefined threshold time) to cause a pop-up menu to appear with attribute selection options specifically associated with the source. This enables a user to transfer a selected subset of the source object attributes to the selected target, rather than all source attributes. Although this may have an effect similar to that associated with use of "style" selection functions in existing word processor applications, it is simpler in that the user need not remember and enter a style name to effect associated changes.

Another variation presently contemplated involves modified usage of 'Set Attributes to ->' menu option. In this variation, selection of 'Set Attributes to ->' causes a secondary pop-up menu to appear adjacent the menu containing 'Set Attributes to ->'. This secondary menu offers the user transfer options associated with named sets of attributes. Selection of a set in this secondary list completes the transfer; i.e. this mode does not require location and action on a source object. The named attribute sets on this secondary menu represent sets previously created and stored by the user. An additional option in this menu allows the user to create and name an additional new set of attributes that can be applied during the current operation, and which is to be included in subsequent appearances of the secondary menu.

These and other effects, benefits, variations and uses of the invention may be more fully appreciated by considering the following description and claims.

BRIEF DESCRIPTION OF DRAWINGS

FIG. 1 illustrates a highlighted/selected target text object whose attributes are to be changed in accordance with the invention.

FIG. 2 shows the display of FIG. 1 including a pop-up menu offering the user a 'Set Attributes To ->' option in accordance with the invention.

FIG. 3 shows the effect on the appearance of the display cursor resulting from selection of 'Set Attributes to ->' via the menu of FIG. 2.

FIG. 4 shows a display containing a source text object having attributes to be transferred to the target object of FIG. 2 in accordance with 'Set Attributes to ->'.

FIG. 5 shows the effect on attributes of the target object in FIG. 1 when the source object of FIG. 4 is selected after selection of 'Set Attributes to ->'.

DETAILED DESCRIPTION

Figure 6:
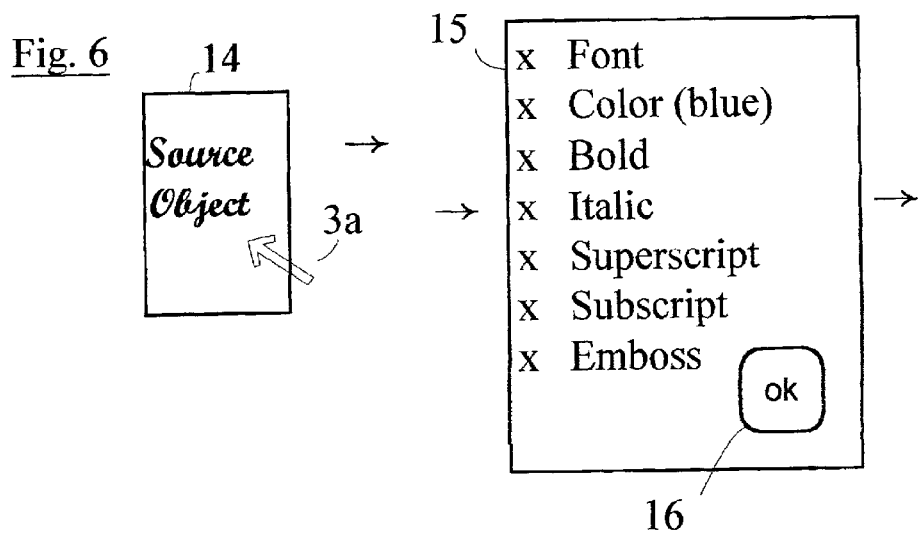
FIG. 6 displays a variation of the process associated with FIGS. 1–5 in which a menu displayed in association with a specific action on the source object allows a user to select subsets of attributes associated with the source object, and to have respective subsets applied to the target object.

FIG. 1 shows a portion 1 of a computer display (or of a display window) containing a target object 2 whose attributes are to be changed in accordance with this invention. At 3, the shown portion also indicates the normal appearance of the display cursor 3 (for reasons which will be apparent as this description develops).

FIG. 2 shows the target object at 4, in a form (overlaid pattern) intended to suggest that this object has been selected in association with a specific action (e.g. depression of the right button on the system mouse). This figure also shows a pop-up menu 5, appearance of which is invoked by the associated action. In addition to conventional choices ('cut', 'copy', 'paste', etc.), menu 5 includes as an option the presently contemplated 'Set Attributes to . . . ' function, that function indicated at 6.

FIG. 3 indicates that on selection of the 'Set Attributes to . . . ' function, appearance of cursor 3 changes to the form shown at 3a, to indicate to the user that additional action is required. At this time, the user locates and selects (e.g. clicks the left mouse button on) a source object, the latter object shown at 10 in FIG. 4.

Source object 10 may be arbitrarily located in relation to the computer file or operating system function providing the display of the target object. The source and target objects may be located in different computer file and/or different display windows generated by the computer Operating System.

As suggested in FIG. 5, the action of selecting the source object results immediately in a transfer to the target object of the attributes of the source object. If the target and source objects are word process text, the transfer alters attributes of the target object (font, emphasis, etc.) to those contained by the source object, without modifying the substantive context of either object. If target and source are graphic objects, a similar transfer of attributes (line thickness, background, colors, etc.) occurs without change to substantive context.

In FIG. 5, the target object is indicated at 12, in a form suggesting it now has attributes of source object 10. Concurrently, as seen in FIG. 5, appearance of the cursor changes from the altered form 3a to the normal form 3.

The foregoing attribute transfer action can be aborted by user action; e.g. clicking the left mouse button on an empty portion of the display screen or operating the keyboard 'Esc' key.

A variation of this process—suggested in FIG. 6—allows the user to select a subset of the source object attributes and to transfer only the attributes in that subset to the preselected target object. In FIG. 6, the source object is shown at 14 in association with a pop-up menu 15 offering options of subset selection. Menu 15 is caused to appear by a special user action on source object 14; e.g. holding the left mouse button depressed for an inordinately long interval of time (i.e. an interval significantly longer than the interval associated with normal left mouse button selection of objects).

The options included in menu 15 are a list of attributes appropriate to the target object. The exemplary list shown at 15—associated with a 'rich' text block—includes options for the user to choose like 'font', 'color', 'bold', 'italic', etc. These choices are pre-checked with 'x' notations, and subject to being deselected/unchecked by the user. Thus, if the user wants to propagate a subset of the source attributes to the target object, that subset will consist of the listed options not deselected when the user selects 'OK' button 16.

Figure 7:
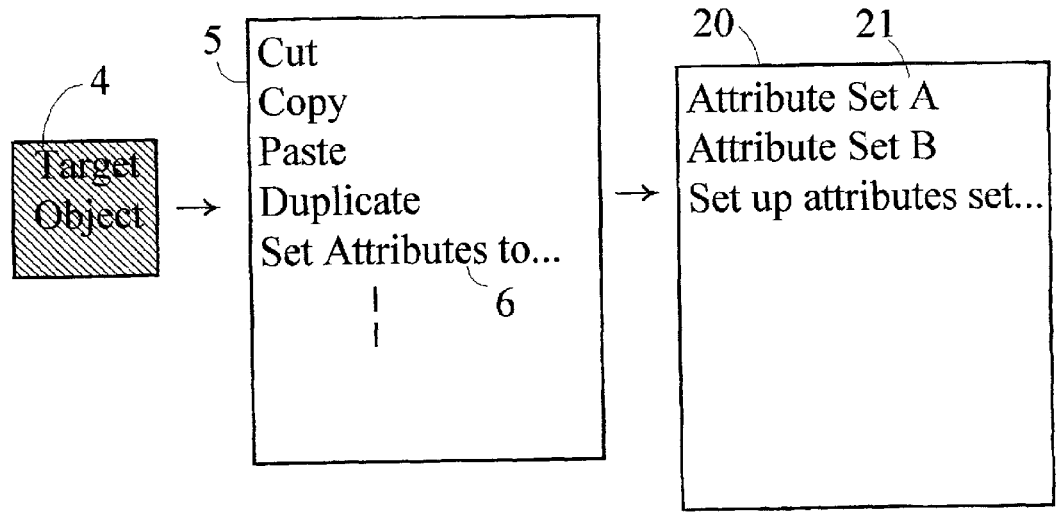
FIG. 7 displays another variation of the process associated with FIGS. 1–5 wherein selection of 'Set Attributes to ->' causes a secondary menu to appear offering the user options of selecting named sets of attributes previously chosen and named by the user; an additional option in this menu allows the user to create and name a new set of attributes for use with that menu.

Another variation of the presently contemplated process for changing object attributes is shown in FIG. 7. Here, the user performs a special action in association with selection of the 'Set Attributes to . . . ' option in menu 5 (see FIG. 2). Although the special action per se is not considered relevant to this invention, examples of such would be (a) a specific sequence of mouse button clicks; or (b) holding down a specific key (e.g. 'Ctl' or 'Alt') in combination with the specific mouse button sequence.

In response to this special action, secondary pop-up menu 20 appears; this menu containing selection choices 21, representing names of previously designated attribute sets, and additional choice 22, offering the user the option to designate and name a new set of attributes.

Selection of a name choice 21, applies a set of attributes associated with the selected name to a target object preselected as before. General examples of named attribute sets are indicated at 21 as 'Attribute Set A' and 'Attribute Set B'. It is understood that in practice the names will be arbitrary, since they would be assigned by the user as such sets are assembled. Individual attributes constituting a set would be attributes appropriate to the target context; e.g. for text these sets would include, in various combinations, attributes such as those shown at 15 (FIG. 6), and for graphics they could include functions associated with brightness, hue, greyscale intensity, shading, fill, etc.

Also included as a selection choice at 21 is the option 'Set Up Attributes set'. When this option is selected, the user is prompted to type in attribute functions constituting elements of a new set and a name to assign to that set. This new set is then applied to the target in the current operation and included as a named component of list 21 in subsequent appearances of that list.

Implementation Considerations

The foregoing attribute transfer processes are easily implemented by simple additions to operating system and application software.

Those skilled in the relevant arts understand that existing windows-based operating systems and their compatible applications allow for generation of pop-up menus similar to menu 5 (FIG. 2), but lacking options equivalent to 'Set Attributes to . . . '. It is also known generally that such menus appear when a mouse or equivalent pointer is 'right-clicked' while the display cursor is on a selected object.

It is also common practice, in existing software-based applications, to change the appearance of the display cursor (as is done presently at 3a, FIG. 3) during execution of specific operations (e.g. line drawing operations in many contemporary graphics programs). It is also common practice, in existing applications, to produce secondary pop-up menus (such as those shown presently at 15 in FIG. 6 and 20 in FIG. 7) in association with execution of user-controlled functions.

Thus, all of the functions described in this application are subject to implementation by additions to existing operating systems and software applications, such additions involving state of the art software increments.

In the presently intended context, software consists of expressions, in any language, code or notation, representing computer instructions or groups of instructions which, upon execution by a computer, produce associated functions and effects in the computer.

We claim:

1. For a digital computer system, a method of enabling a user of said system to modify attributes of an object currently displayed by said system, said method comprising:

in association with selection of a said displayed object by said user, said object representing a target of attribute modification, producing a menu containing a 'Set Attributes to . . . ' option, in association with selection of said 'Set Attributes to . . . ' option by said user, and under direction of said user, transferring a predetermined set of attributes to said target object;

wherein said attribute transferring step includes actions performed by said user for locating a source object separate from said target object, said source object having said predetermined set of attributes; and selecting said source object; selection of said source object by said user causing said system to apply attributes of said source object to said target object.

2. The method of claim 1 which is applicable to target and source objects located in discretely separate computer files and in discretely separate display windows.

3. The method of claim 1 wherein said step of selecting said source object includes an additional step of enabling said user to select a proper subset of the attributes possessed by said source object.

4. The method of claim 1 wherein said attribute transferring step includes:

presenting said user with an option menu contains a list of named sets of attributes that are subject to selection by said user; and upon selection of a named attribute set from said list applying the attributes of the selected set to said target object.

5. The method of claim 4 wherein said list includes a 'Set Up Attributes set . . . ' option; and, in response to selection by said user of said 'Set Up Attributes set . . . ' option, including steps of:

enabling said user to define and name a new set of attributes for incorporation into said list; and applying the attributes in said named new set to said target object.

6. A software-based system for enabling a user of a computer system to modify attributes of displayed objects comprising:

an element for presenting a menu to said user, in association with selection by said user of a target object whose attributes are to be modified; said menu containing a 'Set Attributes to . . . ' option subject to selection by said user;

an element responsive to selection of said 'Set Attributes to . . . " option for operating under direction of said user to modify attributes of said target object;

wherein said element responsive to selection includes:

means enabling said user to locate and select a source object discretely separate from said target object; and means responsive to selection by said user of said source object for transferring attributes of said source object to said target object.

7. The system in accordance with claim 6 wherein said element responsive to selection of 'Set Attributes to . . . ' option includes:

means enabling said user to designate a named set of attributes; and means responsive to designation of said named set for transferring the attributes in said named set to said target object.

8. The system in accordance with claim 7 wherein said means enabling said user to designate a named set of attributes includes:

means for presenting to said user a list of options; said list including named sets previously established by said user and an option 'Set Up Attributes set';

means responsive to selection by said user of a named set in said list for transferring attributes of the respective set to said target object; and means responsive to selection by said user of said 'Set Up Attributes set' option for: (a) enabling said user to define and name a new set of attributes; (b) applying said new set of attributes to said target object; and (c) including the named new set in subsequent presentations of said list.

* * * * *